United States Patent
Heinrichs

(10) Patent No.: US 8,201,468 B2
(45) Date of Patent: Jun. 19, 2012

(54) ELECTROMOTIVE FURNITURE DOUBLE DRIVE AND SWITCH ARRANGEMENT

(75) Inventor: Andreas Heinrichs, Vlotho (DE)

(73) Assignee: Dewert Antriebs- und Systemtechnik GmbH, Kirchlengern (DE)

( * ) Notice: Subject to any disclaimer, the term of this patent is extended or adjusted under 35 U.S.C. 154(b) by 701 days.

(21) Appl. No.: 12/333,931

(22) Filed: Dec. 12, 2008

(65) Prior Publication Data

US 2009/0301239 A1 Dec. 10, 2009

(30) Foreign Application Priority Data

Dec. 13, 2007 (DE) ............... 20 2007 017 535 U

(51) Int. Cl.
  *F16H 27/02* (2006.01)
(52) U.S. Cl. .......................... 74/89.23; 74/89.37
(58) Field of Classification Search ............... 74/89.23, 74/89.34, 89.37; 5/616; 297/85 M, 330; 200/47, 61.41, 61.42, 329
  See application file for complete search history.

(56) References Cited

U.S. PATENT DOCUMENTS

| | | | |
|---|---|---|---|
| 3,825,809 A * | 7/1974 | Gatland et al. | 318/282 |
| 5,675,849 A | 10/1997 | Koch | |
| 5,890,585 A * | 4/1999 | Nakamura et al. | 200/47 |
| 6,269,707 B1 | 8/2001 | Koch | |
| 7,331,557 B2 * | 2/2008 | Dewert | 248/419 |

FOREIGN PATENT DOCUMENTS

| | | |
|---|---|---|
| DE | 41 36 373 | 5/1993 |
| DE | 197 18 255 | 9/1998 |
| DE | 102004009878 | 9/2005 |
| DE | 102004023243 | 12/2005 |
| EP | 0 372 032 B1 | 5/1992 |
| WO | WO 2004/032687 | 4/2004 |
| WO | WO 2004/071244 | 8/2004 |

* cited by examiner

*Primary Examiner* — Thomas R Hannon
*Assistant Examiner* — Phillip A Johnson
(74) *Attorney, Agent, or Firm* — Henry M. Feiereisen; Ursula B. Day

(57) ABSTRACT

An electromotive furniture double drive includes at least one drive motor, which is in driving engagement with a speed reduction gear train. An output element, which is secured against rotation, can be moved in its longitudinal direction by means of the speed reduction gear train. At least the speed reduction gear train and the output element are arranged in the housing, and the end positions of each output element are limited by at least one end switch. The output element and/or the housing has an adjustment device by means of which the position of the switching threshold of the at least one end switch can be adjusted from an area outside the housing.

23 Claims, 3 Drawing Sheets

ELECTROMOTIVE FURNITURE DOUBLE DRIVE AND SWITCH ARRANGEMENT

CROSS-REFERENCES TO RELATED APPLICATIONS

This application claims the priority of German Patent Application, Serial No. 20 2007 017 535.3, filed Dec. 13, 2007, pursuant to 35 U.S.C. 119(a)-(d), the content of which is incorporated herein by reference in its entirety as if fully set forth herein.

BACKGROUND OF THE INVENTION

The present invention relates, in general, to an electromotive furniture double drive and switch arrangement.

A furniture double drive has two drive motors arranged on the side of a housing in pot-shaped motor casings. The furniture double drive, called "double drive" in the following description for sake of simplicity, has two speed reduction gear trains which are respectively coupled to the drive motors. A spindle is securely connected to the output element of each speed reduction gear train. A spindle nut, which is secured against rotation, sits on the spindle and forms the output element of each power train of the double drive. For example, a furniture component connected to an output element is adjusted via the output element, which sits securely on the spindle nut.

As an alternative, the double drive is equipped with a drive motor and a speed reduction gear train. This speed reduction gear train is designed in such a way that a spindle, which is secured against rotation, is movable in its longitudinal direction. This spindle then forms the output element of the double drive. The two end faces of the spindle and the attached output elements can be in a drive connection with the components to be adjusted, depending on the movement direction of the spindle.

Another approach involves a double drive which includes two individual drives, wherein each electric motor, together with a speed reduction gear train and an output element, is arranged in a respective housing. The two housings are either directly connected to each other or connected to each other by at least one connection element which is arranged between the housings.

The end switch(es) are arranged in a so-called end switch rail having a U-shaped cross section. The middle leg of this end switch rail is provided with a row of holes so that the end switches can be placed at different positions in the end switch rails. The respective end switch controls hereby the motor by switching off the motor circuit as the end switch makes contact, when the output element reaches a middle position or an end position, for example. There are many drawbacks associated with this approach. Adjustment of the end switches requires opening of the housing in order to render the end switches accessible. In addition, as the positions of the end switches depend on the required adjustment path and the adjustment range of the furniture component to be adjusted, users of double drives perceive this type of end switch adjustment as inadequate since one cannot see how the end positions of the output elements of a furniture drive are to be adjusted.

It would therefore be desirable and advantageous to address these problems and to obviate other prior art shortcomings

SUMMARY OF THE INVENTION

According to one aspect of the present invention, an electromotive furniture double drive includes at least one drive motor, a housing, an output element secured against rotation accommodated in the housing, a speed reduction gear train accommodated in the housing and coupled to the at least one drive motor to move the output element in a longitudinal direction between two end positions, and an end switch to limit end positions of the output element, wherein at least one member selected from the group consisting of output element and the housing, has an adjustment device to adjust a position of a switching threshold (switching point) of the end switch from outside the housing.

The present invention resolves prior art problems by providing the output element and/or the housing with an adjustment device by which the position of the switching threshold of the end switch is adjustable from the outside of the housing.

According to another advantageous feature of the present invention, the adjustment device may include an actuation element, with the housing having a wall proximal to the adjustment device and including an opening for passage of the actuation element. The adjustment device may be coupled with the switching threshold of the end switch to set the switching threshold of the end switch at different distances in relation to the speed reduction gear train.

According to another advantageous feature of the present invention, the adjustment device may include a housing-like end switch receptacle to receive the end switch, with the housing wall being provided with a slot in a marginal area adjacent to the end switch receptacle to allow setting of the end switch receptacle at different distances with respect to the speed reduction gear train.

It is now possible to move the end switch from the outside, without having to disassemble the furniture double drive, because the end switch receptacle, for example in the form of a housing-like end switch receptacle, is embodied such that, with appropriate handling, a displacement or adjustment is possible, wherein, after the displacement, the position of the end switch receptacle and, thus also the end switch, is secured.

According to another advantageous feature of the present invention, the output element and/or the housing may have an adjustment device and the housing wall associated with the adjustment device may have a cutout, wherein the adjustment device is coupled with the switching threshold in such a way that the respective switching threshold of the at least one end switch can be positioned at different distances with respect to the speed reduction gear train. As a result, the end switch can be arranged on the output element or on a component that can be moved with the output element.

According to another advantageous feature of the present invention, the end switch receptacle may be movably guided in a guide adjacent to the wall of the housing. In this way, the position of each end switch is precisely fixed and no jamming or tilting can occur, when the end switch receptacle is moved.

According to another advantageous feature of the present invention, the marginal areas that border each slot in the wall of the housing may have a profile which complements a profile of the end switch receptacle. As a result, the end switch receptacle and, thus also the end switch are secured against unintended displacement. These corresponding profiles can also be considered to be latching means.

According to another advantageous feature of the present invention, the end switch receptacle may have a spring bar or a flexible tongue which is provided with a profile to engage the profile of the slot-delimiting marginal areas and which can be elastically deformed, when exposed to an application of force such that the profiles disengage. If the profiles are disengaged, the end switch receptacle can be shifted in the longitudinal direction of the spindle. As a result, the displacement of the end switch receptacle is possible without assistance of a tool by deforming the spring bar or the flexible tongue with the finger.

To actuate the end switch, or in the event of the presence of plural end switches, at least one tow bar is provided within the housing of the double drive to track the linear movement of the spindle. This tow bar is arranged and designed such that the furniture component, which can be adjusted via the movable spindle, remains in the respective end position by switching off the drive motor.

According to another advantageous feature of the present invention, the tow bar may be configured in the form of a flat rod having at least one longitudinal groove for engagement of a guide bar of the end switch receptacle. As a result of the longitudinal groove in connection with the guide bar, it is ensured that the tow bar is correctly positioned in relation to the respective end switch so that the plungers for switching are completely actuated. In order to ensure gentle actuation of the plungers of the end switch, the tow bar has a beveled area at the free end facing the respective end switch to form the ramp surface.

A double drive for adjusting the adjustable parts of a slatted frame can be used in a wide variety of applications. A so-called articulated lever can be placed on the adjustment shafts for the backrest and the foot part in a rotationally fixed manner. In order for the free end area of this articulated lever to contact the output element of the furniture drive at all times, a block-like slider may be securely placed on the spindle end which faces away from the step-down gear. This slider can be embodied as a hollow body so as to save material, wherein the slider and/or the spindle form the output element.

According to another advantageous feature of the present invention, the tow bar may be secured to the hollow body or the output element in spaced-apart relationship to the spindle. However, it is also possible to secure the tow bar at one or more thread turns which face away from the step-down gear.

In order for a user of the furniture drive to recognize a maximal distance the spindle travels, a scale may be arranged on the outside of the housing adjacent to the slot. This scale can show the stroke in the form of digits, for example, so as to facilitate the adjustment for the user.

According to another advantageous feature of the present invention, the output element and/or the housing may have an adjustment device that can be formed by a movable end switch receptacle.

The adjustment device can be adjusted either directly manually or by a tool. The wall of the housing has hereby in the area of the adjustment device a slot, an opening, or a slot-forming or opening forming cutout so that the adjustment device is movable along a slot or rotatable in a bore from the outer side of the housing.

The adjustment device can be freely accessible from the outer side of the housing or covered by a cover element in order to prevent ingress of moisture into the interior of the housing, for example. During adjustment of the at least one adjustment device, at least a distance between a ramp surface and an end switch or a plunger actuator of an end switch is adjusted and fixed after the adjustment process has been completed. During actuation by the ramp surface, the plunger actuator or the end switch has a switching threshold that switches the at least one switch contact of the end switch. Due to this arrangement, the switching threshold of the at least one end switch is coupled to the adjustment device in such a way that the respective switching threshold of the at least one end switch can be set at different distances with respect to the speed reduction gear train.

According to another advantageous feature of the present invention, the distance between the ramp surface and the one end switch is adjusted which switches off the electric motor in the completely actuated position or in the completely moved-out position of the furniture component. In this way, the maximum stroke position of the attached furniture component can be adjusted so that the stroke movement of, e.g., a head part or a foot part of a slatted frame is limited.

According to another advantageous feature of the present invention, the end switch can be coupled with or securely connected to at least one adjustment device. Suitably, the plunger of the end switch is coupled with or securely connected to the adjustment device. In accordance with still another feature of the present invention, the ramp surface for actuating the end switch may be coupled with or securely connected to the adjustment device. In accordance with still another feature of the present invention, the linearly movable output element, e.g., in the form of a spindle, or in the form of a slider which is movable but constraint against rotation, or in the form of a tow bar, may coupled with or securely connected to at least one adjustment device. Of course, any combination of the afore-described connections is conceivable as well.

According to another advantageous feature of the present invention, the adjustment device may be formed by an end switch receptacle having settings that lock in place in a form-fitting manner. Other embodiments may involve clamping screws or adjusting screws so as to define a continuously variable adjustment device. As described above, the adjustment device can be integrated at or in the housing of the double drive or arranged at or placed in the housing. The adjustment device may, however, also be arranged at or in the output element, inserted in the output element, or coupled to the output element.

According to another advantageous feature of the present invention, the end switch may be arranged on a printed circuit board, which includes in addition control elements for controlling the at least one electric motor, for example in the form of branch circuits, electrical terminals, or in the form of electromechanical switches. In accordance with such an embodiment, at least one end switch, which is associated with the printed circuit board, is coupled with or securely connected to an adjustment device.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
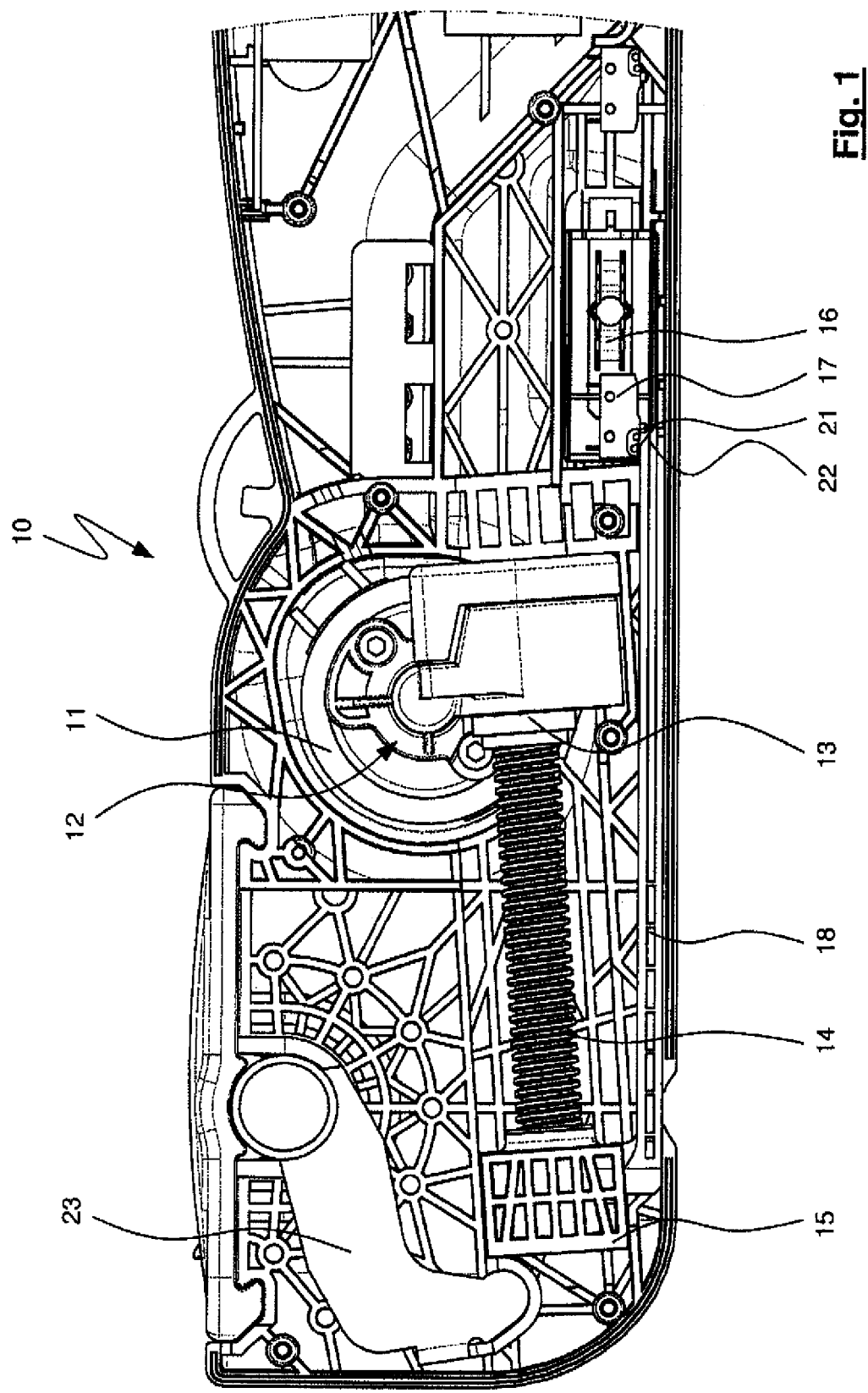
FIG. 1 is a simplified illustration of an exemplary embodiment of a furniture double drive in accordance with the invention

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a simplified illustration of an exemplary embodiment of a furniture double drive in accordance with the invention, generally designated by reference numeral 10 and including an electromotive drive motor 11 and a speed reduction gear train 12. This speed reduction gear train 12 has a worm gear and a worm wheel which engages the worm gear and which is securely connected to or forms a single-piece formed part with a drive nut 13. The spindle 14 is hereby rotatably inserted into the internal thread bore of the worm wheel and securely connected to the slider 15. The slider 15, in turn, is guided by guide bars, in a rotationally fixed manner, in the housing in the longitudinal direction of the spindle 14. FIG. 1 shows that the spindle 14, which is secured against rotation, travels in its longitudinal direction, when the drive motor is switched on, wherein the travel direction is dependent on the rotation direction of the worm wheel.

In the illustrated embodiment, a block-like slider 15, which can be embodied as a hollow body, is securely placed onto the end of the spindle 14 which end faces away from the speed reduction gear train 12. This block-like slider 15 cooperates with an articulated lever 23 that is placed, in a rotationally fixed manner, onto a shaft of a furniture component that is to be adjusted. The slider 15 and/or the spindle 14 form hereby the linearly moving output element. In kinematically reverse manner with respect to the embodiment according to FIG. 1, another embodiment has a spindle 14 that is securely connected with the worm wheel or forms a single-piece formed part with the worm wheel. A drive nut 13, which is secured against rotation and connected with the slider 15, is placed onto the thread turns of the spindle. In accordance with this embodiment, which is not shown in greater detail, the drive nut 13 and/or the slider 15 form the output element that moves in the longitudinal direction of the spindle 14 as soon as the electric drive motor 11 drives the worm wheel.

In the assembled state, an end switch receptacle 16, which is open on one side, is arranged adjacent to a vertical wall of the housing in the interior of the furniture drive 10 and open in the direction of the wall of the housing. An end switch 17 is inserted in this end switch receptacle 16. This end switch 17 is equipped with plungers 21 in known manner so as to switch the drive motor 11. A tow bar 18 is provided at a distance to the spindle 14 and has on the end which faces the end switch 17 a slanted or ramp surface 22. The inclined ramp surface 22, which is slanted with respect to the movement direction of the tow bar, approaches the end switch 17 and the plunger 21 as soon as the drive motor 11 forces the output element 14, 15 with attached tow bar 18 in a first movement direction, which in accordance with FIG. 1, extends to the right until the slantingly inclined ramp surface 22 actuates the plunger 21 and switches a switching contact, disposed inside the end switch 17 and coupled with the plunger 21, such that the circuit of the drive motor 11 is interrupted and the motor 11 is switched off.

Figure 3:
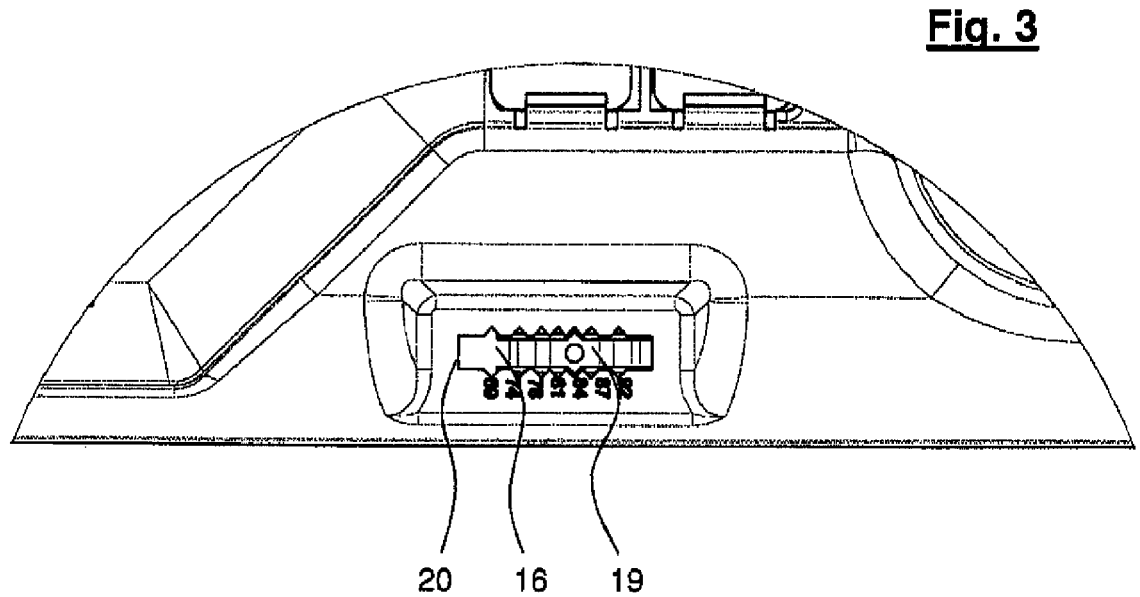
FIG. 3 is a perspective illustration of a detail of the end switch receptacle.
Figure 5:
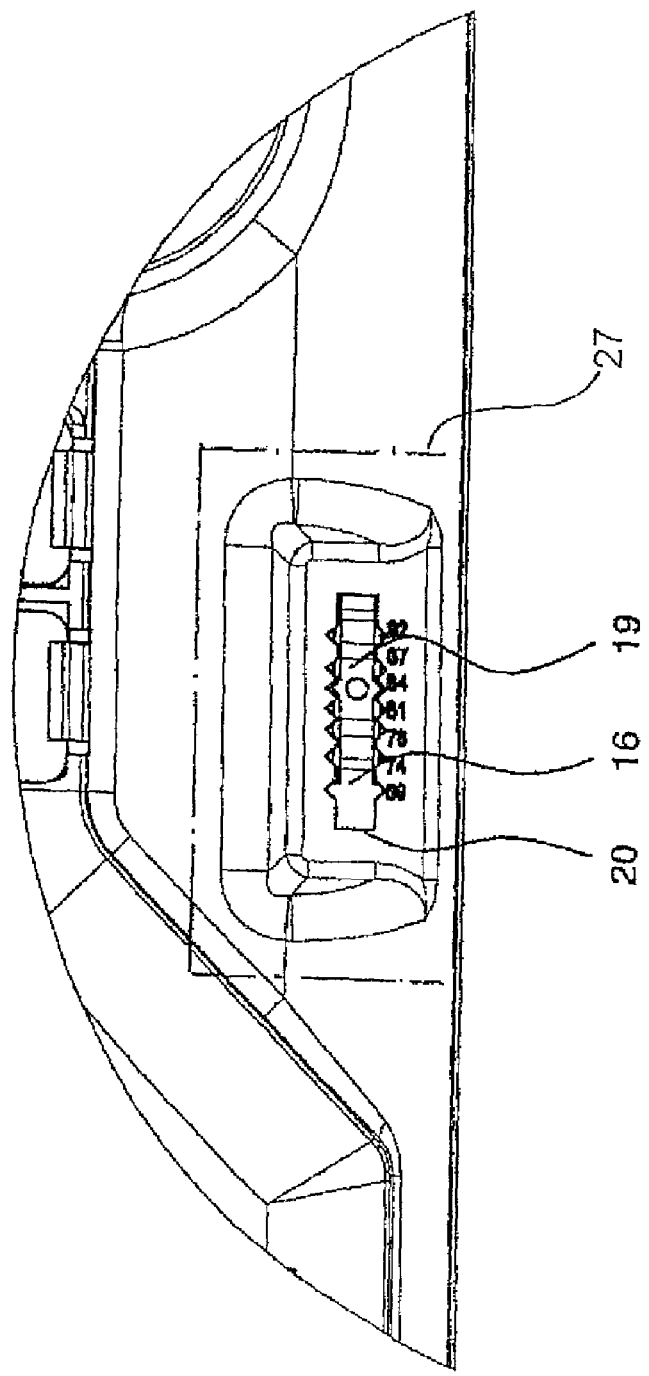
FIG. 5 is a perspective illustration of the detail of the end switch receptacle, depicting a cover element to cover the adjustment device.

The end switch receptacle 16 shown in FIG. 1 is embodied as an adjustment device 16, which is securely connected to the end switch 17. As is shown in FIG. 3, the wall of the housing in the area of the adjustment device 16 has a cutout 20 in the form of a slot 20. The adjustment device 16 can be covered by a cover element 27, as indicated in FIG. 5 by the dash-dotted line in order to prevent ingress of moisture into the interior of the housing, for example. Furthermore, the end switch 17 has a switching threshold as soon as the plunger 21 has been actuated by the ramp surface 22 to a predefined degree. By moving the adjustment device 16 within the cutout 20, the distance between the ramp surface 22 and the plunger 21, which triggers the switching threshold, changes so that the switching threshold of the end switch 17 can be fixed at different distances in relation to the speed reduction gear train 12 that is secured in the housing, by the spring bar 19 which snaps into place in the cutout 20.

In the shown exemplary embodiment, the tow bar 18 is secured to the block-like slider 15 by a catch that is not explained in more detail. Thus, the tow bar tracks the movement of the spindle 14, which is embodied as the output element. FIG. 1 shows that the end switch 17 is positioned such that the motor is switched off at a certain pivot angle of the articulated lever 23.

Figure 2:
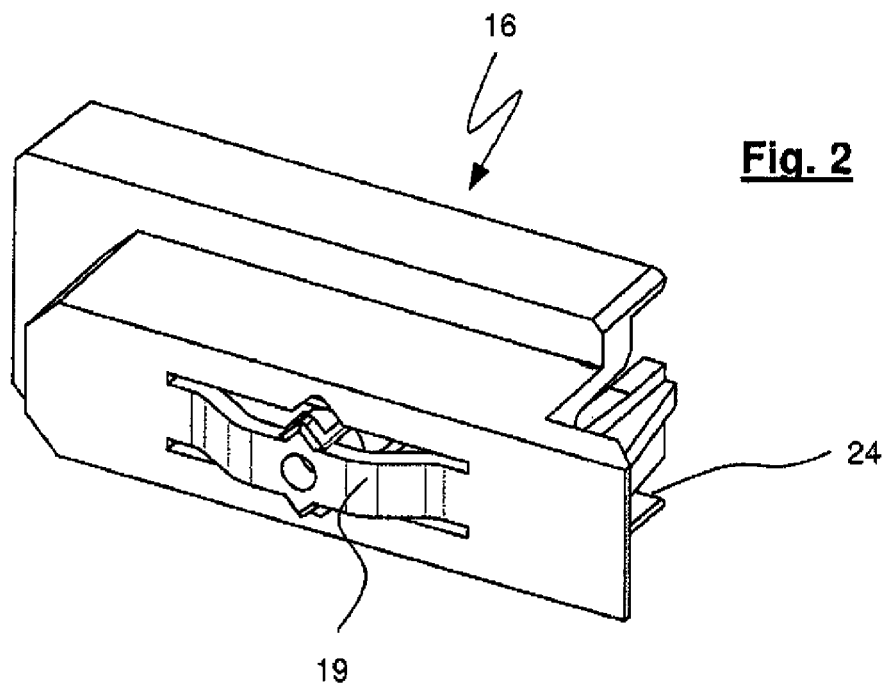
FIG. 2 is a cutaway view of the housing of the furniture double drive.

FIG. 2 shows the end switch receptacle 16 as a detail. The end switch 17 inserted therein is not visible. However, FIG. 2 shows clearly that the end switch receptacle 16 is provided with a spring bar 19 at the side that faces the housing wall. Due to application of force, e.g. manual application of force, from the outside, the spring bar can be deformed such as to be disposed within the housing. The spring bar 19 is provided with an arrow-shaped tip on both longitudinal sides.

FIG. 3 shows that the housing is provided with a slot 20 in which the spring bar 19 is movably guided. The marginal areas of the housing that delimit the slot 20 are provided with multiple triangular profiles for selective engagement of the arrow-shaped tip of the spring bar 19. The housing is provided with a scale that corresponds to the triangular profiles. This scale shows that, in the exemplary embodiment shown, the linear adjustment path of the spindle 14 can be increased or decreased by 23 mm. Therefore, the user can immediately recognize to which value he can change the path of the spindle 14 after actuation of the spring bar 19.

In contrast to the illustrated embodiment, the tow bar 18 may also be secured directly to the spindle 14. In contrast to this illustration, the tow bar 18 could also be embodied as a telescope, wherein then the extendable tube follows the movement of the spindle 14.

Figure 4:
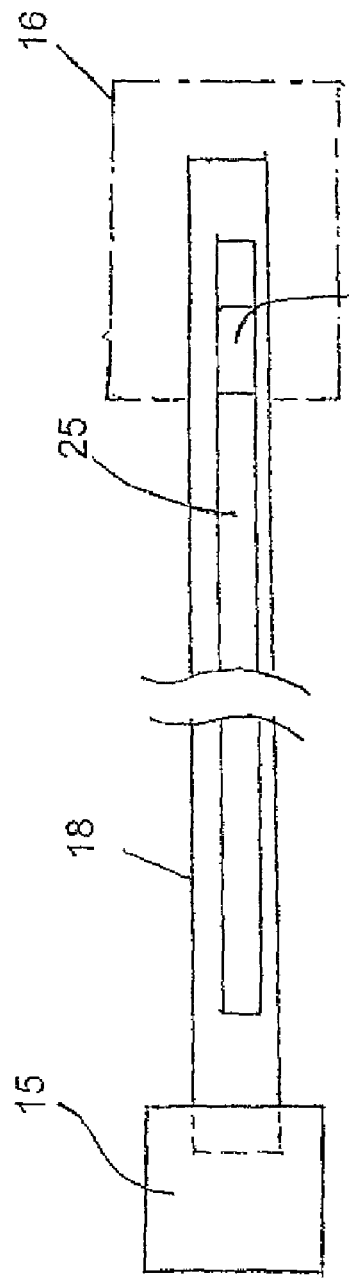
FIG. 4 is a schematic illustration of a tow bar in the form of a flat rod.

FIG. 2 also shows that the end switch receptacle 16 is provided with a guide groove 24 at the side that faces away from the spring bar 19, for engagement of tow bar 18 for guidance. An alternative is shown in FIG. 4, whereby the tow bar 18 is configured in the form of a flat rod having at least one longitudinal groove 25 for engagement of a guide bar 26 of the end switch receptacle 16.

The invention is not limited to the illustrated exemplary embodiment. It is essential that the end switch 17 or the end switches are respectively secured or inserted in an end switch receptacle 16 which is provided with a spring bar 19 or a flexible tongue that can be deformed from the outside to such a degree that the end switch receptacle 16 is movable in the longitudinal direction of the spindle 14.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein.

What is claimed is:

1. An electromotive double drive, comprising:
   at least one drive motor;
   a housing;
   an output element secured against rotation accommodated in the housing;
   a speed reduction gear train accommodated in the housing and coupled to the at least one drive motor to move the output element in a longitudinal direction between two end positions;
   an end switch to limit end positions of the output element; and
   wherein at least one member selected from the group consisting of the output element and the housing, has an adjustment device to adjust a position of a switching threshold of the end switch from outside the housing, said adjustment device comprising an actuation element, said housing having a wall proximal to the adjustment device and including an opening for passage of the actuation element,
   wherein the adjustment device includes an end switch receptacle to receive the end switch, said wall being provided with a slot in a marginal area adjacent to the end switch receptacle to allow setting of the end switch receptacle at the different distances with respect to the speed reduction gear train.

2. The double drive of claim 1, wherein the adjustment device is coupled with the switching threshold of the end switch to set the switching threshold of the end switch at different distances in relation to the speed reduction gear train.

3. The double drive of claim 1, further comprising a guide adjacent to the housing wall to movably guide the end switch receptacle.

4. The double drive of claim 3, wherein the marginal area has a profile complementing a profile of the end switch receptacle.

5. The double drive of claim 4, wherein the end switch receptacle comprises a spring bar or a flexible tongue having a profile to complement the profile of the marginal area.

6. The double drive of claim 1, further comprising a scale arranged on the outside of the housing laterally next to the slot.

7. The double drive of claim 1, wherein the end switch receptacle is structured to be moved.

8. The double drive of claim 1, wherein the adjustment device is freely accessible from the outside of the housing.

9. The double drive of claim 1, further comprising a cover element to cover the adjustment device.

10. The double drive of claim 1, wherein the end switch is coupled with or securely connected to the adjustment device.

11. The double drive of claim 10, wherein the end switch has a plunger, said plunger being coupled with or securely connected to the adjustment device.

12. The double drive of claim 1, wherein the output element is structured to move linearly, and is coupled with or securely connected to the adjustment device.

13. The double drive of claim 1, wherein the end switch receptacle has settings that formfittingly snap into place.

14. The double drive of claim 1, wherein the adjustment device is structured to be adjusted in a continuously variable manner, and secured against displacement by screws.

15. The double drive of claim 1, wherein the adjustment device is connected to the output element by a configuration selected from the group consisting of an arrangement at or in the output element, attachment to the output element, and a coupling with the output element.

16. An electromotive double drive, comprising:
    at least one drive motor;
    a housing;
    an output element secured against rotation accommodated in the housing, said output element being a linearly moving spindle;
    a speed reduction gear train accommodated in the housing and coupled to the at least one drive motor to move the output element in a longitudinal direction between two end positions;
    an end switch to limit end positions of the output element; and
    a tow bar accommodated in the housing and tracking a linear movement of the spindle,
    wherein at least one member selected from the group consisting of the output element and the housing, has an adjustment device to adjust a position of a switching threshold of the end switch from outside the housing,
    wherein the adjustment device includes an end switch receptacle to receive the end switch, said tow bar being configured in the form of a flat rod having at least one longitudinal groove for engagement of a guide bar of the end switch receptacle.

17. The double drive of claim 16, further comprising a slider secured to the spindle on an end distal to speed reduction gear train.

18. The double drive of claim 17, wherein the slider is configured in the form of a hollow body.

19. The double drive of claim 16, wherein the tow bar is secured to the spindle on an end distal to the speed reduction gear train.

20. The double drive of claim 16, wherein the tow bar has a ramp surface which causes the end switch to switch off the drive motor, when the spindle reaches an end position in which a furniture component has fully moved out, by adjusting a distance between the ramp surface and the end switch.

21. An electromotive double drive, comprising:
    at least one drive motor;
    a housing;
    an output element secured against rotation accommodated in the housing, said output element being a linearly moving spindle;
    a speed reduction gear train accommodated in the housing and coupled to the at least one drive motor to move the output element in a longitudinal direction between two end positions;
    an end switch to limit end positions of the output element;
    a tow bar accommodated in the housing and tracking a linear movement of the spindle; and
    a slider secured to the spindle on an end distal to speed reduction gear train
    wherein at least one member selected from the group consisting of the output element and the housing, has an adjustment device to adjust a position of a switching threshold of the end switch from outside the housing,
    wherein the tow bar is secured to the slider and arranged at a distance to two associated walls of the housing.

22. The double drive of claim 21, wherein the tow bar is secured to the spindle on an end distal to the speed reduction gear train.

23. The double drive of claim 21, wherein the tow bar has a ramp surface which causes the end switch to switch off the drive motor, when the spindle reaches an end position in which a furniture component has fully moved out, by adjusting a distance between the ramp surface and the end switch.

* * * * *